United States Patent
Nagata

(10) Patent No.: US 8,436,971 B2
(45) Date of Patent: May 7, 2013

(54) LIQUID CRYSTAL DISPLAY DEVICE

(75) Inventor: Hisashi Nagata, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 227 days.

(21) Appl. No.: 13/003,655

(22) PCT Filed: Jul. 14, 2009

(86) PCT No.: PCT/JP2009/003296
§ 371 (c)(1),
(2), (4) Date: Jan. 11, 2011

(87) PCT Pub. No.: WO2010/007761
PCT Pub. Date: Jan. 21, 2010

(65) Prior Publication Data
US 2011/0122351 A1    May 26, 2011

(30) Foreign Application Priority Data
Jul. 15, 2008 (JP) ................. 2008-183973

(51) Int. Cl.
*G02F 1/1337* (2006.01)
(52) U.S. Cl.
USPC .......................................... 349/129; 349/130
(58) Field of Classification Search ........... 349/129–130
See application file for complete search history.

(56) References Cited

U.S. PATENT DOCUMENTS

| | | | |
|---|---|---|---|
| 6,323,926 B2 * | 11/2001 | Watanabe et al. | 349/130 |
| 6,583,835 B1 | 6/2003 | Yoshida et al. | |
| 6,661,488 B1 | 12/2003 | Takeda et al. | |
| 6,897,929 B2 * | 5/2005 | Takeda et al. | 349/129 |
| 6,903,796 B2 | 6/2005 | Kataoka | |
| 2002/0036740 A1 | 3/2002 | Kubo et al. | |
| 2002/0075436 A1 | 6/2002 | Kubo et al. | |
| 2003/0043336 A1 | 3/2003 | Sasaki et al. | |

(Continued)

FOREIGN PATENT DOCUMENTS

JP    2001-083520    3/2001

OTHER PUBLICATIONS

International Preliminary Report on Patentability mailed Feb. 17, 2011 in corresponding PCT Application No. PCT/JP2009/003296.

(Continued)

*Primary Examiner* — James Dudek
(74) *Attorney, Agent, or Firm* — Nixon & Vanderhye P.C.

(57) ABSTRACT

To prevent occurrence of display roughness in a PSA-type liquid crystal display device, a liquid crystal display device of the present invention includes: a first substrate 10 which includes a signal line 15 for supplying a display signal to thin film transistors, an insulating layer 18 provided on the signal line 15, and pixel electrodes 12 provided in a matrix arrangement; a second substrate 20 which includes a counter electrode 22; a liquid crystal layer 30 interposed between the first substrate 10 and the second substrate 20; a vertical alignment film 33 provided between the first substrate 10 and the liquid crystal layer 30; and an alignment sustaining layer 32 provided between the vertical alignment film 33 and the liquid crystal layer 30 for regulating an orientation of liquid crystal molecules 31 included in the liquid crystal layer 30. In a region extending between two of the pixel electrodes 12 and extending over the signal line 15, the insulating layer 18 has a first elevated portion 18a extending along the signal line 15 and protruding above the pixel electrodes 12 toward the liquid crystal layer 30.

17 Claims, 9 Drawing Sheets

U.S. PATENT DOCUMENTS

2003/0048401 A1 3/2003 Hanaoka et al.
2003/0095229 A1 5/2003 Inoue et al.
2003/0202143 A1 10/2003 Yoshida et al.
2005/0116200 A1 6/2005 Nakanishi et al.
2005/0146664 A1 7/2005 Hanaoka et al.
2007/0019144 A1 1/2007 Nakanishi et al.
2007/0273818 A1 11/2007 Yoshida et al.
2009/0059148 A1 3/2009 Hanaoka et al.

OTHER PUBLICATIONS

International Search Report for PCT/JP2009/003296, mailed Oct. 20, 2009.

* cited by examiner (a)

(b)

(a) SCANNING LINE POTENTIAL — 10V / GND (b) COUNTER ELECTRODE POTENTIAL — +4V / -4V (c) PIXEL ELECTRODE POTENTIAL
STORAGE CAPACITOR LINE POTENTIAL
SIGNAL LINE POTENTIAL — 0V (d) VOLTAGE APPLIED ACROSS LIQUID CRYSTAL LAYER — +4V / -4V (a)

COMPARATIVE EXAMPLE (b)

PRESENT INVENTION (c)

SCANNING LINE POTENTIAL — 10V
                              GND

COUNTER ELECTRODE
POTENTIAL

+4V
0V
-4V

PIXEL ELECTRODE POTENTIAL
STORAGE CAPACITOR LINE
POTENTIAL
SIGNAL LINE POTENTIAL

0V

VOLTAGE APPLIED ACROSS
LIQUID CRYSTAL LAYER

+4V
0V
-4V

LIQUID CRYSTAL DISPLAY DEVICE

This application is the U.S. national phase of International Application No. PCT/JP2009/003296, filed 14 Jul. 2009, which designated the U.S. and claims priority to Japanese Application No. 2008-183973, filed 15 Jul. 2008, the entire contents of each of which are hereby incorporated by reference.

TECHNICAL FIELD

The present invention relates to a vertical alignment type liquid crystal display device which includes a vertical alignment layer.

BACKGROUND ART

In recent years, liquid crystal display devices that are characterized by their thinness and light weight are widely used as display devices for the display of personal computers and the display section of mobile information terminals. However, conventional Twisted Nematic mode (TN mode) and Super Twisted Nematic mode (STN mode) liquid crystal display devices disadvantageously have narrow viewing angles. To solve this problem, various technical developments have been made.

A known example of liquid crystal display devices which have improved viewing angle characteristics is a divisional alignment type liquid crystal display device which includes a vertical alignment type liquid crystal layer. A liquid crystal display device of this type is called a VA (Vertical Alignment) mode liquid crystal display device. As one example of the VA mode, Patent Document 1 discloses a MVA (Multi-domain Vertical Alignment) mode. In the MVA mode, each of a pair of substrates which oppose each other with the intervention of a liquid crystal layer has an alignment regulating structure for regulating the alignment of liquid crystal molecules. Specifically, the alignment regulating structure may be a protrusion or a slit formed in an electrode. With the alignment regulating structure such as a protrusion and a slit, a plurality of domains among which the azimuth of inclination of liquid crystal molecules is different are formed when a voltage is applied across the liquid crystal layer, so that the viewing angle characteristics are improved.

Patent Document 2 proposes a different type of VA mode, which is called a CPA (Continuous Pinwheel Alignment) mode. In the CPA mode, one of a pair of electrodes that oppose each other with the intervention of a liquid crystal layer has an opening or notch. An oblique electric field which is generated above the opening or notch is utilized to radially incline liquid crystal molecules, whereby a wide viewing angle is realized.

Patent Document 3 discloses a technique of stabilizing a radial inclination alignment of liquid crystal molecules in the CPA mode. According to this technique, a radial inclination alignment formed by an alignment regulating structure provided in one of the substrates (an opening or notch formed in an electrode, which contributes to generation of an oblique electric field) is stabilized by another alignment regulating structure (e.g., protrusion) provided in the other substrate.

On the other hand, providing a polymer structure as an alignment sustaining layer for regulating the pretilt angle and the pretilt direction of liquid crystal molecules is proposed in, for example, Patent Documents 4, 5, 6, and 7. This is called a PSA (Polymer-Sustained Alignment) technology. The polymer structure is formed by photopolymerizing or thermally polymerizing a polymerizable composition contained beforehand in the liquid crystal layer. By providing such a polymer structure in a VA mode liquid crystal display device, the alignment stability and the response characteristics can be improved.

CITATION LIST

Patent Literature

Patent Document 1: Japanese Laid-Open Patent Publication No. 11-242225
Patent Document 2: Japanese Laid-Open Patent Publication No. 2003-43525
Patent Document 3: Japanese Laid-Open Patent Publication No. 2002-202511
Patent Document 4: Japanese Laid-Open Patent Publication No. 2002-23199
Patent Document 5: Japanese Laid-Open Patent Publication No. 2003-149647
Patent Document 6: Japanese Laid-Open Patent Publication No. 2003-177408
Patent Document 7: Japanese Laid-Open Patent Publication No. 2003-307720

SUMMARY OF INVENTION

Technical Problem

The step of forming the polymer structure (hereinafter, referred to as "PSA formation step") is carried out while the liquid crystal molecules are in an inclination alignment in the presence of a predetermined voltage across the liquid crystal layer, rather than in a vertical alignment. Application of the voltage across the liquid crystal layer in the PSA formation step is carried out such that the polarity of the applied voltage is periodically inverted (i.e., alternate driving is performed), whereby polarization of the liquid crystal is prevented.

Examples of the method of voltage application (alternate driving) in the PSA formation step include: (1) oscillating the potential of the counter electrode while the thin film transistors (TFT) provided in the respective pixels are made conducting so that the potential of the pixel electrodes is fixed; and (2) oscillating the potential of the counter electrode while the TFTs are made non-conducting so that the pixel electrodes are floating (electrically floating).

First, a specific example of the method (1) is described with reference to FIG. 10. A CPA mode liquid crystal display device 500 shown in FIG. 10 includes a TFT substrate 510 which includes TFTs (not shown) in the respective pixels, a counter substrate 520 which opposes the TFT substrate 510, and a vertical alignment type liquid crystal layer 530 which is interposed between these substrates. On the counter substrate 520, a protrusion 523 is provided which is configured to exert an alignment regulating force on liquid crystal molecules 531 and to fix the alignment center of the liquid crystal domains.

As shown in FIGS. 10(a), 10(b), and 10(c), a gate-on voltage of +10V is applied to the gate electrode of the TFT via a scanning line 514 so that the TFT is conducting. Meanwhile, the pixel electrode 512 is supplied with a potential of 0 V via a signal line (not shown). Under these conditions, the potential of the counter electrode 522 is oscillated between +4 V (FIG. 10(a)) and −4 V (FIG. 10(b)), whereby the polarity of the voltage which is applied across the liquid crystal layer 530 is periodically inverted in synchronization with the oscillation of the potential of the counter electrode 522. In this way, the alternate driving is realized.

Next, a specific example of the method (2) is described with reference to FIG. 11. As shown in FIGS. 11(a), 11(b), and 11(c), a gate-off voltage of −5 V is applied to the gate electrode of the TFT via the scanning line 514 so that the TFT is non-conducting. Meanwhile, the pixel electrode 512 is floating (electrically floating). Under these conditions, the potential of the counter electrode 522 is oscillated between +8 V (FIG. 11(a)) and −8 V (FIG. 11(b)), whereby the potential of the pixel electrode 512 is also oscillated. For example, if the liquid crystal capacitance and the storage capacitor $C_S$ (schematically expressed by the graphical symbol in the drawing) have equal capacitance values, the potential of the pixel electrode 512 oscillates between +4 V (FIG. 11(a)) and −4 V (FIG. 11(b)). Accordingly, the polarity of the voltage which is applied across the liquid crystal layer 530 is periodically inverted. In this way, the alternate driving is realized.

However, the present inventor conducted researches and found that, when the PSA formation step is carried out while a voltage is applied across the liquid crystal layer 530 according to the methods (1) and (2), display roughness occurs for the reasons described below, so that the display quality deteriorates.

FIG. 12 is a top view of a liquid crystal display device which is seen from the upper surface side, showing the liquid crystal molecules 531 in one pixel which are in an inclination alignment in the PSA formation step. FIG. 12(a) schematically shows an ideal inclination alignment example of the liquid crystal molecules 531. FIGS. 12(b) and 12(c) schematically show inclination alignment examples resulting from the methods (1) and (2), which can cause display roughness. In these diagrams, for the sake of illustration of the inclination alignment of the liquid crystal molecules 531, each of the liquid crystal molecules 531 is sketched such that a portion of the molecule which is closer to the counter electrode 522 appears larger (an end of the liquid crystal molecule 531 which is closer to the counter electrode 522 is expressed by a circle).

In the PSA formation step, ideally, the liquid crystal molecules 531 in one pixel are inclined uniformly and radially around the protrusion 523 (radial inclination alignment) as shown in FIG. 12(a). This serves to realize display of a wide viewing angle, with small display unevenness. However, when the alternate driving is carried out according to the methods (1) and (2), a potential which is different from 0 V is always supplied to the counter electrode 522 while the potentials of a signal line 516 and a storage capacitor line 518 are maintained at 0 V as shown in FIG. 10 and FIG. 11, so that the liquid crystal molecules 531 lying above these lines are also inclined. Here, the signal line 516 and the storage capacitor line 518 are extending along the boundary between two adjacent pixels, and therefore, the liquid crystal molecules 531 lying above these lines are generally equally affected by alignment regulating forces from the both pixels in opposite directions (i.e., the alignment regulating forces from the both pixels are canceled). Accordingly, the liquid crystal molecules 531 lying above these lines are oriented along the directions of extension of the signal line 516 and the storage capacitor line 518 as shown in FIGS. 12(b) and 12(c) (although illustration of liquid crystal molecule 531 lying above the storage capacitor line 518 is omitted).

FIG. 12(b) shows that all of the liquid crystal molecules 531 lying above a pair of signal lines 516 are inclined downward in the drawing along the signal lines 516. FIG. 12(c) shows that the liquid crystal molecules 531 lying above one of the pair of signal lines 516 are inclined downward in the drawing while the liquid crystal molecules 531 lying above the other signal line 516 are inclined upward in the drawing.

In any of these cases, due to the influence of the inclination alignment of the liquid crystal molecules 531 lying above the signal lines 516, the orientations of the liquid crystal molecules 531 in the vicinity of the signal lines 516 (encircled regions a and b in the drawings) are disturbed to be nonuniform, so that the ideal inclination alignment shown in FIG. 12(a) cannot be obtained. Alternatively, although not shown, the liquid crystal molecules 531 lying above one of the signal lines 516 may be inclined in opposite directions (e.g., upward inclination and downward inclination in the drawing), making a junction at a certain point on the signal line 516, and also, the junction may move to a different position. Even in such a case, the alignment of the liquid crystal molecules 531 in the pixel is disturbed to be nonuniform, so that the ideal inclination alignment cannot be obtained.

If the PSA formation step is carried out with such a disturbed inclination alignment, disturbances occur in the alignment of liquid crystal molecules in a display operation due to the formed polymer structure. As a result, the alignment varies among the pixels, leading to occurrence of display roughness (nonuniform luminance). In the PSA formation step, a large voltage may be applied across the liquid crystal layer for the purpose of increasing the process speed. In this case, the disturbances in the liquid crystal in the PSA formation step are strongly memorized due to the alignment regulating force of the polymer structure, resulting in occurrence of greater roughness in a display operation.

The present invention was conceived in view of the above circumstances. One of the objects of the present invention is to provide a PSA-type liquid crystal display device which is capable of displaying images of higher quality with reduced display roughness.

Solution to Problem

A liquid crystal display device of the present invention, which has a plurality of pixels, includes: a first substrate which includes thin film transistors corresponding to respective ones of the plurality of pixels, a signal line for supplying a display signal to the thin film transistors, an insulating layer provided on the signal line, and pixel electrodes provided in a matrix arrangement so as to correspond to the plurality of pixels; a second substrate which includes a counter electrode that opposes the pixel electrodes; a liquid crystal layer interposed between the first substrate and the second substrate; a vertical alignment film provided between the first substrate and the liquid crystal layer; and an alignment sustaining layer provided between the vertical alignment film and the liquid crystal layer for regulating an orientation of liquid crystal molecules included in the liquid crystal layer, wherein in a region extending between two of the pixel electrodes and extending over the signal line, the insulating layer has a first elevated portion extending along the signal line and protruding above the pixel electrodes toward the liquid crystal layer.

In one embodiment, in a region extending between two of the pixel electrodes and extending over the signal line, the insulating layer has plural ones of the first elevated portion and at least one first recessed portion interposed between the plurality of first elevated portions, the first recessed portion having a smaller thickness than the plurality of first elevated portions.

In one embodiment, the first recessed portion is provided at a middle of one pixel when viewed along a direction of extension of the signal line.

In one embodiment, each of the plurality of pixels includes a plurality of subpixels, the pixel electrode includes subpixel electrodes corresponding to respective ones of the plurality of subpixels, and the first recessed portion is provided at a middle of one subpixel when viewed along a direction of extension of the signal line.

In one embodiment, the first elevated portion includes a slope portion whose thickness increases along a direction from a center to a perimeter of the pixel.

In one embodiment, in a region extending between two of the pixel electrodes and extending over the signal line, the insulating layer has a first alignment control portion for regulating an orientation of liquid crystal molecules lying above the signal line in terms of a direction along the signal line.

In one embodiment, the first substrate includes a scanning line for supplying a gate signal to the thin film transistors, and in a region extending between two of the pixel electrodes and extending over the scanning line, the insulating layer has a second elevated portion extending along the scanning line and protruding above the pixel electrodes toward the liquid crystal layer.

In one embodiment, in a region extending between two of the pixel electrodes and extending over the scanning line, the insulating layer has plural ones of the second elevated portion and at least one second recessed portion interposed between the plurality of second elevated portions, the second recessed portion having a smaller thickness than the plurality of second elevated portions.

In one embodiment, the second recessed portion is provided at a middle of one pixel when viewed along a direction of extension of the scanning line.

In one embodiment, each of the plurality of pixels includes a plurality of subpixels, the pixel electrode includes subpixel electrodes corresponding to respective ones of the plurality of subpixels, and the second recessed portion is provided at a middle of one subpixel when viewed along a direction of extension of the signal line.

In one embodiment, the second elevated portion includes a slope portion whose thickness increases along a direction from a center to a perimeter of the pixel.

In one embodiment, in a region extending between two of the pixel electrodes and extending over the scanning line, the insulating layer has a second alignment control portion for regulating an orientation of liquid crystal molecules lying above the scanning line in terms of a direction along the scanning line.

In one embodiment, the first substrate has a storage capacitor which is formed by a storage capacitor electrode electrically coupled to the pixel electrodes and a storage capacitor counter electrode which opposes the storage capacitor electrode with the intervention of the insulating layer, and a storage capacitor line electrically coupled to the storage capacitor counter electrode, and in a region extending over the storage capacitor line, the insulating layer has a third elevated portion extending along the storage capacitor line and protruding above the pixel electrodes toward the liquid crystal layer.

In one embodiment, in a region extending over the storage capacitor line, the insulating layer has plural ones of the third elevated portion and at least one third recessed portion interposed between the plurality of third elevated portions, the third recessed portion having a smaller thickness than the third elevated portions.

In one embodiment, the third recessed portion is provided at a middle of one pixel when viewed along a direction of extension of the storage capacitor line.

In one embodiment, each of the plurality of pixels includes a plurality of subpixels, the pixel electrode includes subpixel electrodes corresponding to respective ones of the plurality of subpixels, and the third recessed portion is provided at a middle of one subpixel when viewed along a direction of extension of the storage capacitor line.

In one embodiment, the third elevated portion includes a slope portion whose thickness increases along a direction perpendicular to a direction of extension of the storage capacitor line.

In one embodiment, in a region extending over the storage capacitor line, the insulating layer has a third alignment control portion for regulating an orientation of liquid crystal molecules lying above the storage capacitor line in terms of a direction along the storage capacitor line.

Another liquid crystal display device of the present invention, which has a plurality of pixels, includes: a first substrate which includes thin film transistors corresponding to respective ones of the plurality of pixels, a signal line for supplying a display signal to the thin film transistors, an insulating layer provided on the signal line, and pixel electrodes provided in a matrix arrangement so as to correspond to the plurality of pixels; a second substrate which includes a counter electrode that opposes the pixel electrodes; a liquid crystal layer interposed between the first substrate and the second substrate; and a vertical alignment film provided between the first substrate and the liquid crystal layer, wherein in a region extending between two of the pixel electrodes and extending over the signal line, the insulating layer has a first elevated portion extending along the signal line and protruding above the pixel electrodes toward the liquid crystal layer.

Advantageous Effects of Invention

According to the present invention, in the process of forming the alignment sustaining layer of a PSA-type liquid crystal display device, the shape of the insulating layer contributes to stable alignment of liquid crystal molecules lying above signal lines, scanning lines, and storage capacitor lines such that the molecules are oriented in more desirable directions. Therefore, in the process of forming an alignment control layer, disturbances in the alignment of liquid crystal molecules lying above the pixel electrodes decrease, so that the alignment control layer can exert an ideal alignment regulating force on the liquid crystal molecules. As a result, variations in the luminance characteristics among the pixels decrease, so that occurrence of roughness in a display operation can be reduced.

Also, according to the present invention, the shape of the insulating layer extending over the signal lines, the scanning lines, and the storage capacitor lines of the liquid crystal display device contributes to stable alignment of liquid crystal molecules lying above the signal lines, the scanning lines, and the storage capacitor lines such that the molecules are oriented in more desirable directions. Therefore, disturbances in the alignment of liquid crystal molecules lying above the pixel electrodes decrease. As a result, variations in the luminance characteristics among the pixels decrease, so that occurrence of roughness in a display operation can be reduced.

DESCRIPTION OF EMBODIMENTS

Hereinafter, embodiments of the present invention will be described with reference to the drawings. Note that the present invention is not limited to the embodiments which will be described below.

Figure 1:
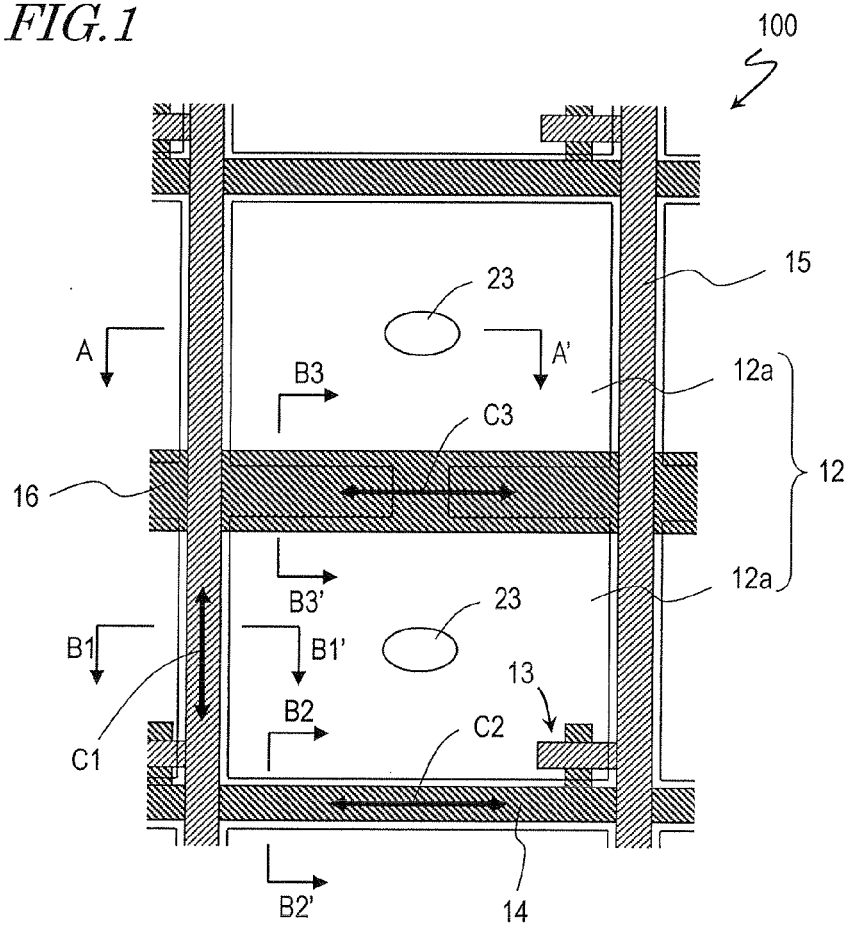
FIG. 1A schematic plan view of a liquid crystal display device 100 of a preferred embodiment of the present invention, showing a region corresponding to one pixel.
Figure 2:
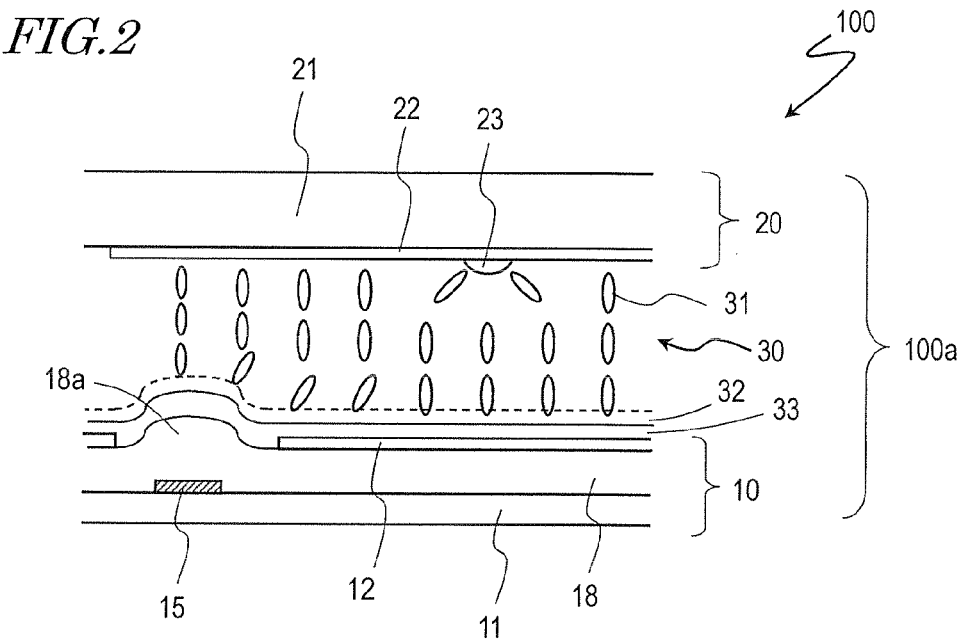
FIG. 2A schematic cross-sectional view of the liquid crystal display device 100 of a preferred embodiment of the present invention, taken along line A-A' of FIG. 1.
Figure 3:
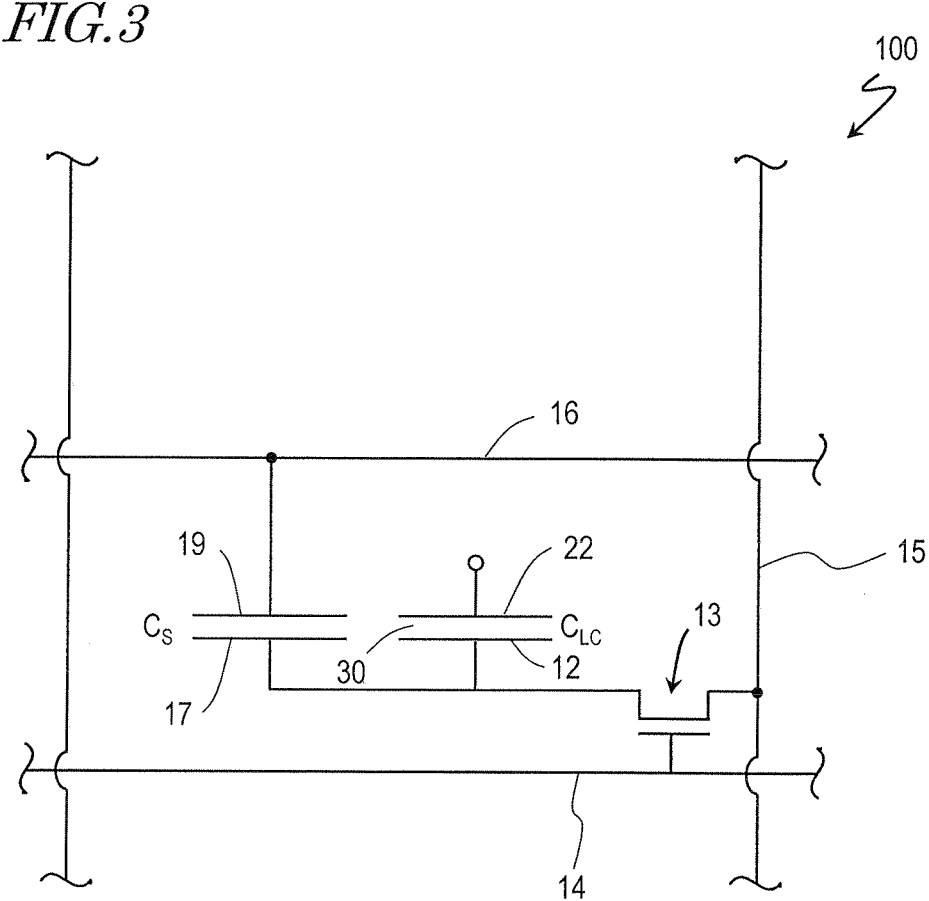
FIG. 3 An equivalent circuit diagram of the liquid crystal display device 100 of a preferred embodiment of the present invention, schematically showing a region corresponding to one pixel.

FIG. 1, FIG. 2, and FIG. 3 show a CPA-mode liquid crystal display device 100 of the present embodiment. FIG. 1 is a plan view schematically showing part of the liquid crystal display device 100 corresponding to one pixel. FIG. 2 is a cross-sectional view taken along line A-A' of FIG. 1, showing a state of the liquid crystal layer across which no voltage is applied (across which a voltage lower than the threshold is applied). FIG. 3 shows an equivalent circuit of one pixel of the liquid crystal display device 100.

As shown in FIG. 1 and FIG. 2, the liquid crystal display device 100 includes a liquid crystal display panel 100a and has a plurality of pixels in a matrix arrangement. The liquid crystal display panel 100a includes an active matrix substrate (first substrate) 10, a counter substrate (second substrate) 20 which opposes the active matrix substrate 10, and a vertical alignment type liquid crystal layer 30 interposed between the active matrix substrate 10 and the counter substrate 20.

The active matrix substrate 10 includes pixel electrodes 12 provided in the respective pixels, thin film transistors (TFT) 13 which are switching elements electrically coupled to the pixel electrodes 12, scanning lines (gate bus lines) 14 for supplying scanning signals (gate signals) to the thin film transistors 13, and signal lines (source bus lines) 15 for supplying display signals to the thin film transistors 13. The thin film transistors 13, the scanning lines 14, and the signal lines 15 are provided on a transparent substrate 11 (e.g., a glass or plastic substrate). On the transparent substrate 11, storage capacitor lines 16 are running generally parallel to the scanning lines 14. The storage capacitor lines 16 are electrically coupled to a storage capacitor counter electrode 19 which will be described later.

Over the thin film transistors 13, the scanning lines 14, the signal lines 15, and the storage capacitor lines 16 (on the liquid crystal layer 30 side), an insulating layer 18 is provided. Over the insulating layer 18, the pixel electrodes 12 are provided in a matrix arrangement so as to correspond to the plurality of pixels. Note that the scanning lines 14, the storage capacitor lines 16, and the gate electrodes of the thin film transistors 13 are provided in a different layer from that of the signal lines 15 and the source and drain electrodes of the thin film transistors 13. Another insulating layer is provided between these layers, although the details of the insulating layer are not shown herein.

The insulating layer 18 is made of an organic photosensitive resin. The insulating layer 18 is formed by forming an organic photosensitive resin layer on the scanning lines 14, etc., and then exposing the resultant layer to light while partially varying the dose of the light such that the layer is shaped as will be described later. Examples of the exposure method include a method where the exposure is completed in one cycle while the dose of light is partially varied, a method where the exposure is repeated through several cycles while the number of exposure cycles is partially varied, or a method which employs halftone exposure. In the case of manufacture of a transflective liquid crystal panel, shaping of the insulating layer 18 may be carried out concurrently in the process of forming recesses and protrusions in the reflecting layer. Note that the insulating layer 18 may be formed of an insulating material of a different type from the organic photosensitive resin. Also, another insulating layer may be provided under the pixel electrodes 12 before the formation of the insulating layer 18 and, in the step of forming the insulating layer 18, the insulating layer 18 may be formed only on the scanning lines 14, the signal lines 15, and the storage capacitor lines 16.

The pixel electrodes 12 include a plurality of subpixel electrodes 12a. A region in which each of the subpixel electrodes 12a is provided is referred to as a subpixel or subpixel region. In the present embodiment, an example of the pixel electrode 12 which includes two subpixel electrodes 12a is illustrated, although the number of subpixel electrodes 12a included in one pixel electrode 12 is not limited to this example. The shape of each subpixel electrode 12a is not limited to the generally rectangular shape as illustrated herein but may preferably be a highly rotationally symmetrical shape (a generally square shape, a generally circular shape, a generally rectangular shape with arc rounded corners, etc.).

The counter substrate 20 includes a counter electrode 22 which opposes the pixel electrodes 12. The counter electrode 22 is provided on a transparent substrate (e.g., a glass or plastic substrate). The counter electrode 22 is typically formed as a single sheet of a transparent conductive film which opposes all the pixel electrodes 12, whereas the pixel electrodes 12 are provided in respective ones of the plurality of pixels. Although not shown herein, typically, a color filter is provided between the transparent substrate 21 and the counter electrode 22. Therefore, the counter substrate 20 is also referred to as a color filter substrate.

As shown in FIG. 3, each of the pixels has a liquid crystal capacitance $C_{LC}$ which is formed by the pixel electrode 12 and the counter electrode 22 and the liquid crystal layer 30 interposed between these layers. Also, each pixel has a storage capacitor $C_S$ which is electrically coupled in parallel to the liquid crystal capacitance $C_{LC}$. The storage capacitor $C_S$ is formed by a storage capacitor electrode 17 which is electrically coupled to the pixel electrodes 12 and a storage capacitor counter electrode 19 which opposes the storage capacitor electrode 17 with the intervention of an insulating substance (insulating layer). The specific structure of the storage capacitor $C_S$ which includes the storage capacitor electrode 17 and the storage capacitor counter electrode 19 may be any of various known structures. For example, the storage capacitor electrode 17 may be formed by patterning a metal layer which is the same as the signal lines 15 such that the storage capacitor electrode 17 overlaps the storage capacitor lines 16, and part of the storage capacitor lines 16 extending over the storage capacitor electrode 17 serves as the storage capacitor counter electrode 19.

As shown in FIG. 2, a surface of the active matrix substrate 10 which is closer to the liquid crystal layer 30 is provided with a vertical alignment film 33. A surface of the vertical alignment film 33 which is closer to the liquid crystal layer 30 is provided with a polymer structure 32 which is an alignment control layer. Another vertical alignment film 33 having such a configuration is also provided on a surface of the counter substrate 20 which is closer to the liquid crystal layer 30. This vertical alignment film 33 also has the polymer structure 32, which is an alignment control layer, on its surface which is closer to the liquid crystal layer 30, although not shown herein. Also, typically, retarders and polarizers may be provided on the outer sides of the active matrix substrate 10 and the counter substrate 20.

The vertical alignment type liquid crystal layer 30 includes liquid crystal molecules 31 of negative dielectric anisotropy, and a chiral agent when necessary. The liquid crystal molecules 31 included in the liquid crystal layer 30 are oriented generally vertical to the surface of the vertical alignment film 33 when no voltage is applied across the liquid crystal layer 30. Note that, in the present embodiment, the polymer structure 32 is provided according to a method which will be described later, so that the liquid crystal molecules 31 are not oriented strictly vertical to the surface of the vertical alignment film 33.

Figure 4:
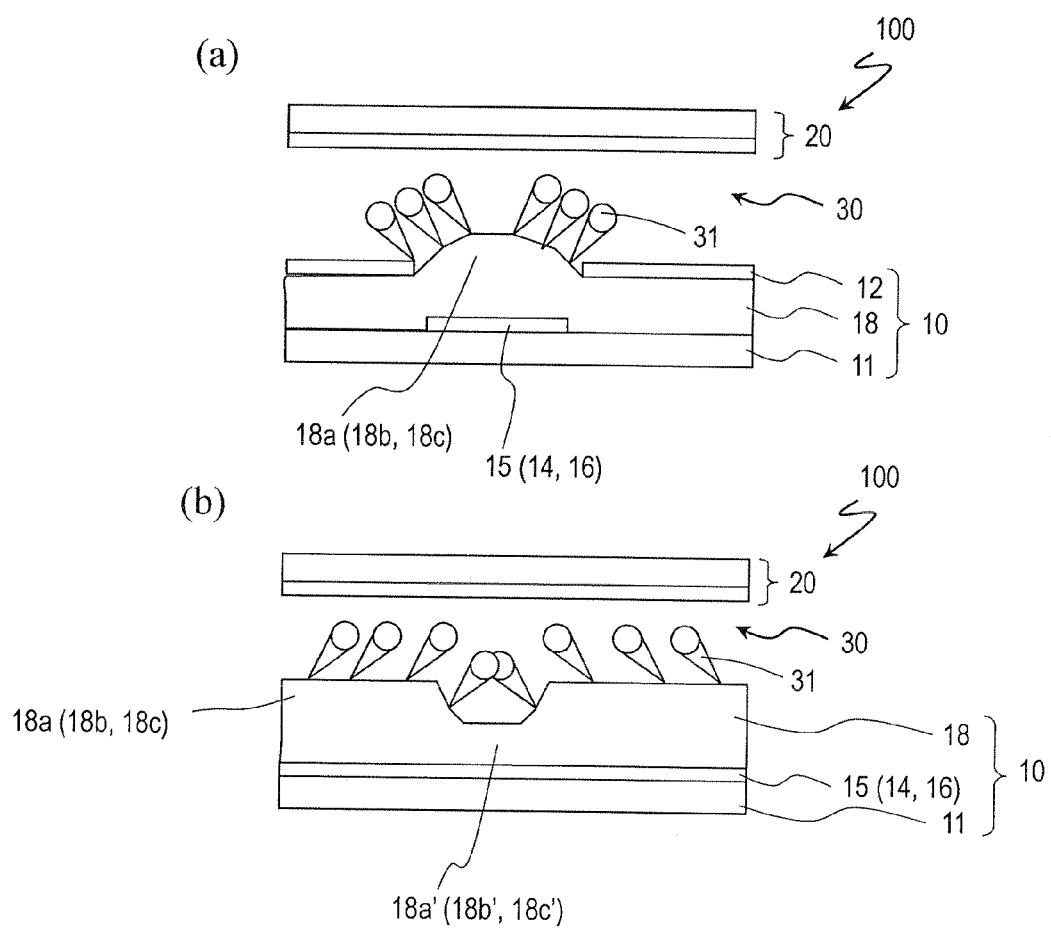
FIG. 4 Diagrams schematically showing the liquid crystal display device 100 of a preferred embodiment of the present invention. (a) is a cross-sectional view taken along line B1-B1', line B2-B2', and line B3-B3' of FIG. 1. (b) is a cross-sectional view taken along line C1, line C2, and line C3 of FIG. 1.

FIG. 4(a) is a cross-sectional view taken along line B1-B1', line B2-B2', and line B3-B3' of FIG. 1. FIG. 4(b) is a cross-sectional view taken along line C1, line C2, and line C3 of FIG. 1. Note that, although the vertical alignment film 33 and the polymer structure 32 are not shown in FIG. 4, the vertical alignment film 33 and the polymer structure 32 extend over the signal lines 15 as shown in FIG. 2 as well as over the scanning lines 14 and the storage capacitor lines 16.

As shown in FIG. 4(a), in a region extending between two pixel electrodes 12 and extending over the signal line 15, the insulating layer 18 has a first elevated portion 18a extending along the signal line 15 and protruding above the pixel electrodes 12 toward the liquid crystal layer 30. In a region extending between two pixel electrodes 12 and extending over the scanning line 14, the insulating layer 18 has a second elevated portion 18b extending along the scanning line 14 and protruding above the pixel electrodes 12 toward the liquid crystal layer 30. Part of the insulating layer 18 extending over the storage capacitor line 16 has a third elevated portion 18c extending along the storage capacitor line 16 and protruding above the pixel electrodes 12 toward the liquid crystal layer 30. The first elevated portion 18a, the second elevated portion 18b, and the third elevated portion 18c each have a slope portion whose thickness increases along a direction from the inside to the outside of a pixel or subpixel.

As shown in FIG. 4(b), in a region extending between the two pixel electrodes 12 and extending over the signal line 15, the insulating layer 18 has a first recessed portion 18a' which is interposed between a plurality of first elevated portions 18a and which has a smaller thickness than the first elevated portions 18a. In a region extending between the two pixel electrodes 12 and extending over the scanning line 14, the insulating layer 18 has a second recessed portion 18b' which is interposed between a plurality of second elevated portions 18h and which has a smaller thickness than the second elevated portions 18b. In a region extending over the storage capacitor line 16, the insulating layer 18 has a third recessed portion 18c' which is interposed between a plurality of third elevated portions 18c and which has a smaller thickness than the third elevated portions 18c.

The first recessed portion 18a' is provided at the middle of one subpixel when viewed along a direction of extension of the signal line 15. In other words, the first recessed portion 18a' is provided at the midpoint of part of the signal line 15 extending between adjacent scanning line and storage capacitor line 16. The second recessed portion 18b' is provided at the middle of one subpixel when viewed along a direction of extension of the scanning line 14. In other words, the second recessed portion 18b' is provided at the midpoint of part of the scanning line 14 extending between two adjacent signal lines 15. The third recessed portion 18c' is provided at the middle of one subpixel (or one pixel) when viewed along a direction of extension of the storage capacitor line 16. In other words, the third recessed portion 18c' is provided at the midpoint of part of the storage capacitor line 16 extending between two adjacent signal lines 15.

Note that each pixel may not be divided into a plurality of subpixels. In such a case, the first recessed portion 18a' may be provided at the middle of one pixel when viewed along a direction of extension of the signal line 15, i.e., at the midpoint of part of the signal line 15 extending between two adjacent scanning lines 14. Also, in this case, the second recessed portion 18b' may be provided at the middle of one pixel when viewed along a direction of extension of the scanning line 14, i.e., at the midpoint of part of the scanning line 14 extending between two adjacent signal lines 15.

The first recessed portion 18a' serves as control means (first alignment control portion) for regulating the orientations of liquid crystal molecules 31 lying above the signal line 15 in terms of the direction along the signal line 15. The second recessed portion 18b' serves as control means (second alignment control portion) for regulating the orientations of liquid crystal molecules 31 lying above the scanning line 14 in terms of the direction along the scanning line 14. The third recessed portion 18c' serves as control means (third alignment control portion) for regulating the orientations of liquid crystal molecules 31 lying above the storage capacitor line 16 in terms of the direction along the storage capacitor line 16.

Figure 5:
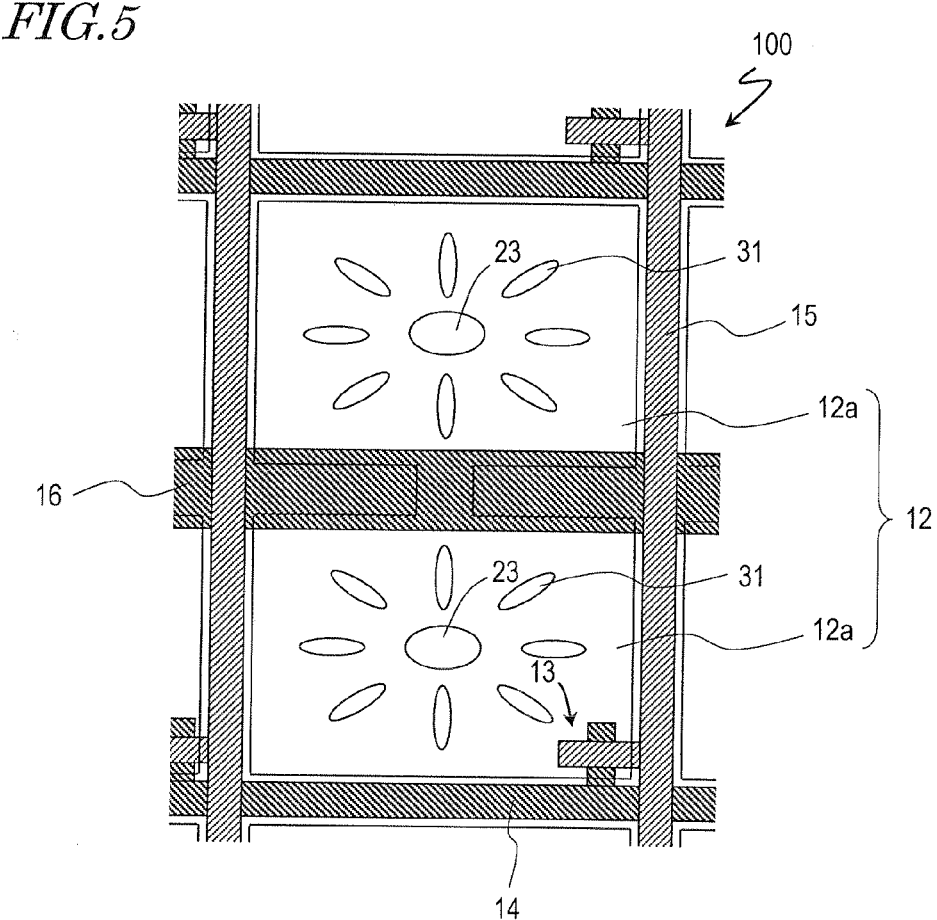
FIG. 5 A plan view of the liquid crystal display device 100, schematically showing the alignment of liquid crystal molecules in the presence of an applied voltage across the liquid crystal layer.
Figure 6:
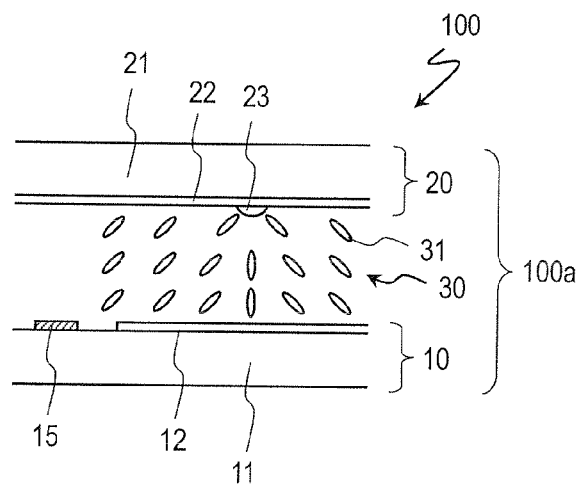
FIG. 6 A cross-sectional view of the liquid crystal display device 100 taken along line A-A' of FIG. 1, schematically showing the alignment of liquid crystal molecules in the presence of an applied voltage across the liquid crystal layer.

Next, FIG. 5 and FIG. 6 show an alignment of the liquid crystal molecules 31 when a predetermined voltage (a voltage not lower than the threshold) is applied between the pixel electrodes 12 and the counter electrode 22. When the predetermined voltage is applied between the pixel electrodes 12 and the counter electrode 22, a liquid crystal domain is formed over each of the subpixel electrodes 12a as shown in FIG. 5 and FIG. 6. In the liquid crystal domain, the liquid crystal molecules 31 are radially inclined (radial inclination alignment).

The reason for formation of such a liquid crystal domain of the radial inclination alignment in every one of the subpixel electrodes 12a is that the subpixel electrode 12a has perimeter edges such that it is almost in the form of an independent island, and the alignment regulating force of oblique electric fields generated at the edges of the subpixel electrode 12a works on the liquid crystal molecules 31. The electric fields generated at the edges of the subpixel electrode 12a are inclined toward the center of the subpixel electrode 12a so that the liquid crystal molecules 31 are radially inclined.

In the present embodiment, the counter substrate 20 has protrusions 23 for stabilizing the radial inclination alignment. The protrusions 23 are provided in regions corresponding to the centers of the liquid crystal domains (i.e., regions corresponding to the centers of the respective subpixel electrodes 12a). The protrusions 23 are made of a transparent dielectric material (e.g., resin). Note that the protrusions 23 are not indispensable elements. Some or all of the plurality of protrusions 23 provided in the respective pixels may be omitted. Alternatively, the protrusions 23 may be replaced by a different type of alignment regulating structure (e.g., an opening formed in the counter electrode 22).

The liquid crystal layer 30 of the liquid crystal display device 100 further includes the polymer structure 32, as schematically shown in FIG. 2, for regulating the orientations of the liquid crystal molecules 31. The polymer structure 32 may be formed over the vertical alignment film by photopolymerizing a polymerizable composition (polymerizable monomer or oligomer) contained beforehand in a liquid crystal material prepared for formation of the liquid crystal layer 30. The polymer structure 32 provides an alignment regulating force to regulate the liquid crystal molecules 31 so as to be in the same alignment as are in the presence of an applied voltage. Even in the absence of an applied voltage, the liquid crystal molecules 31 near the polymer structure 32 are oriented (pretilted) in the same directions as the inclination directions of the molecules which would occur in the presence of an applied voltage. In other words, even in the absence of an applied voltage, the polymer structure 32 regulates the pretilt azimuths of the liquid crystal molecules 31 so as to conform to the radial inclination alignment which would occur in the presence of an applied voltage. Therefore, the alignment stability and the response characteristics improve.

Figure 7:
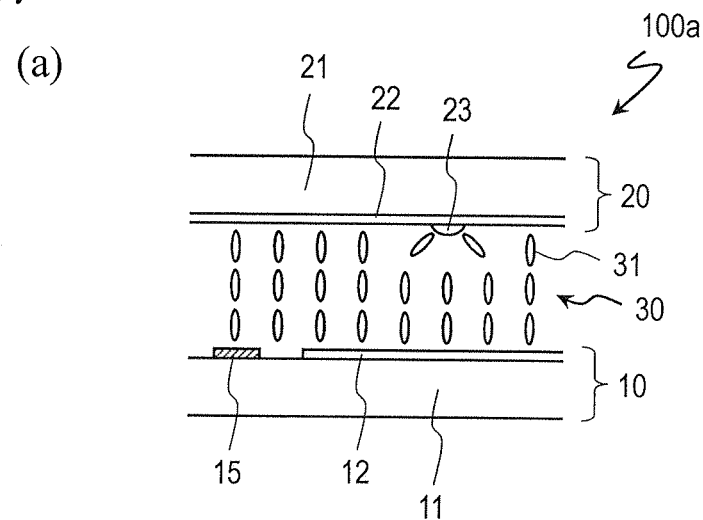
FIG. 7 (a) and (b) are cross-sectional views schematically showing the fabrication steps of the liquid crystal display device 100.
Figure 7:
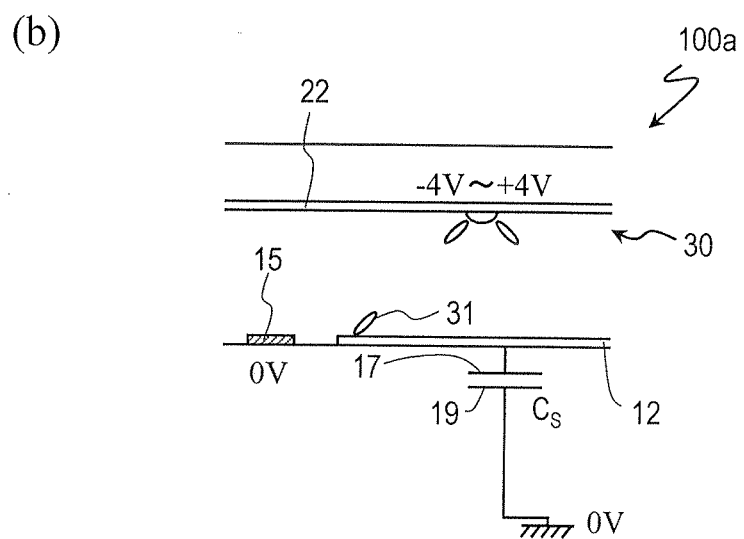
Figure 8:
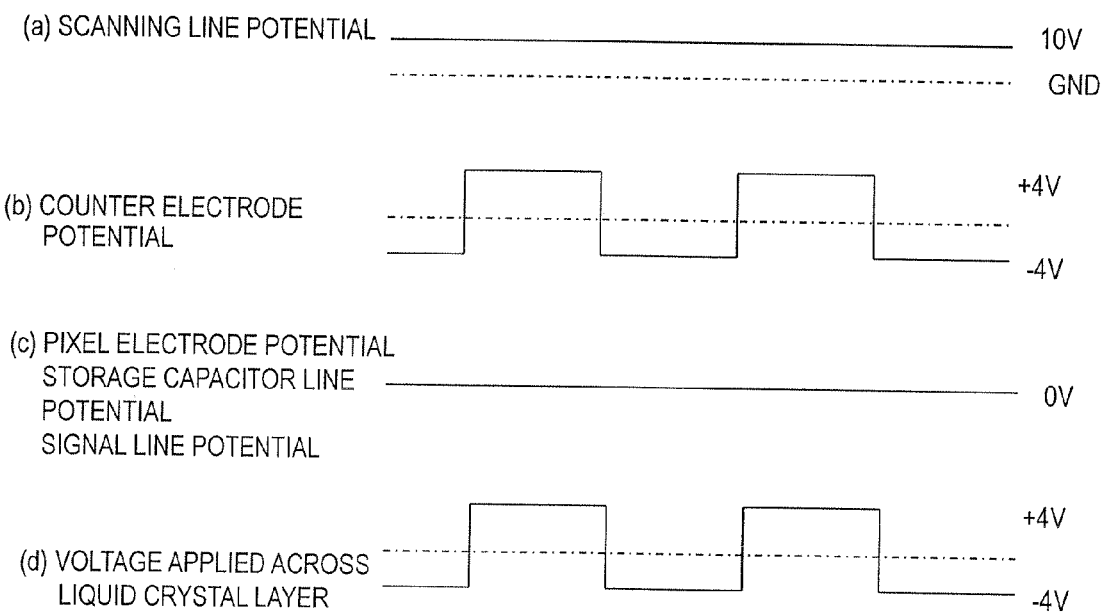
FIG. 8 (a) to (d) show the potentials which are applied to a scanning line 14, a storage capacitor line 16, a counter electrode 22, a signal line 15, a pixel electrode 12, and a liquid crystal layer 30 in the fabrication steps of the liquid crystal display device 100.

Next, a method of fabricating the liquid crystal display device 100 according to the present embodiment is described with reference to FIG. 7 and FIG. 8.

First, as shown in FIG. 7(a), a liquid crystal display panel 100a which contains a polymerizable composition in the liquid crystal layer 30 is prepared. The active matrix substrate 10 and the counter substrate 20 each can be formed according to any of various known methods. As the polymerizable composition, various materials for use in formation of a PSA-type polymer structure (e.g., the materials disclosed in Patent Document 7) can be used.

Then, as shown in FIG. 7(b), the polymerizable composition contained in the liquid crystal layer 30 is polymerized during application of a predetermined voltage across the liquid crystal layer 30 of the liquid crystal display panel 100a, whereby the polymer structure 32 is formed. Typically, the polymerizable composition may be photopolymerizable. The polymerization may be realized by irradiating the liquid crystal layer 30 with light (specifically, UV light). The intensity and duration of the irradiation of the light may be determined appropriately depending on the polymerizable composition used. If the polymerizable composition is thermally polymerizable, the polymerization may be realized by heating.

In the fabrication method of the present embodiment, the PSA formation step includes alternately driving the liquid crystal layer 30 as follows. First, as shown in FIGS. 8(a) and 8(c), a gate-on voltage of +10 V is applied to the gate electrode of a TFT via the scanning line 14 so that the TFT is conducting, while the pixel electrode 12 is provided with a potential of 0 V (GND) via the signal line 15. Meanwhile, the potential of the storage capacitor line 16 is also 0 V (GND). Under these conditions, referring to FIGS. 8(b) and 8(d), the potential of the counter electrode 22 is periodically oscillated between +4 V and −4 V, whereby the polarity of the voltage which is applied across the liquid crystal layer 30 is inverted between +4 V and −4 V. In this way, the alternate driving is realized.

Figure 10:
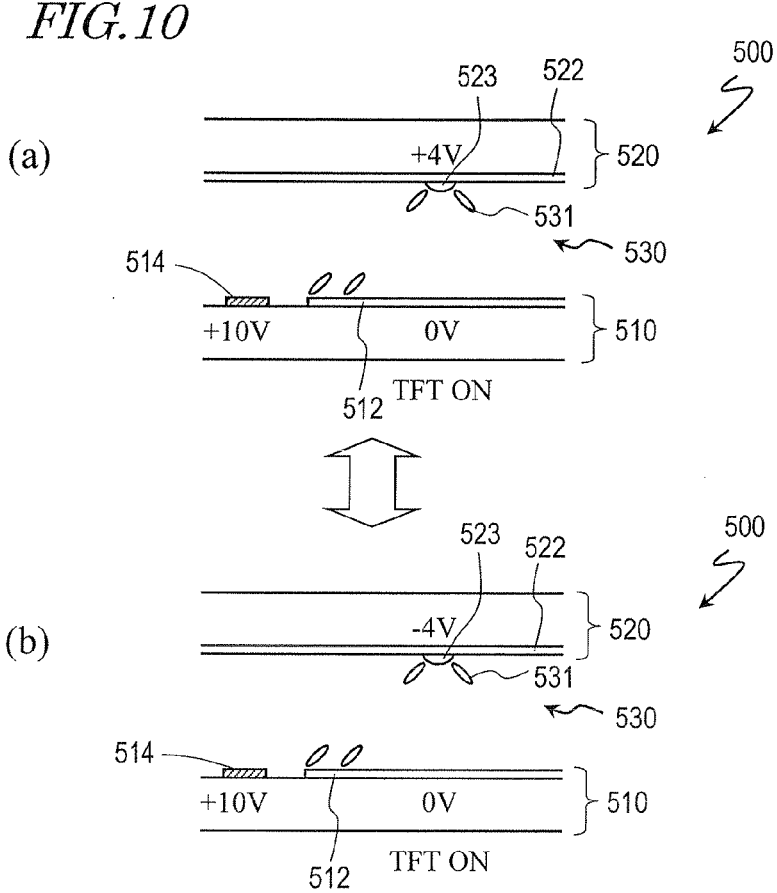
FIG. 10 Diagrams for illustrating the first example of the method of applying a voltage across the liquid crystal layer in the PSA formation step (method (1)).
Figure 10:
Figure 10:
Figure 10:
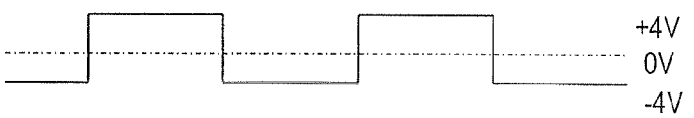
Figure 11:
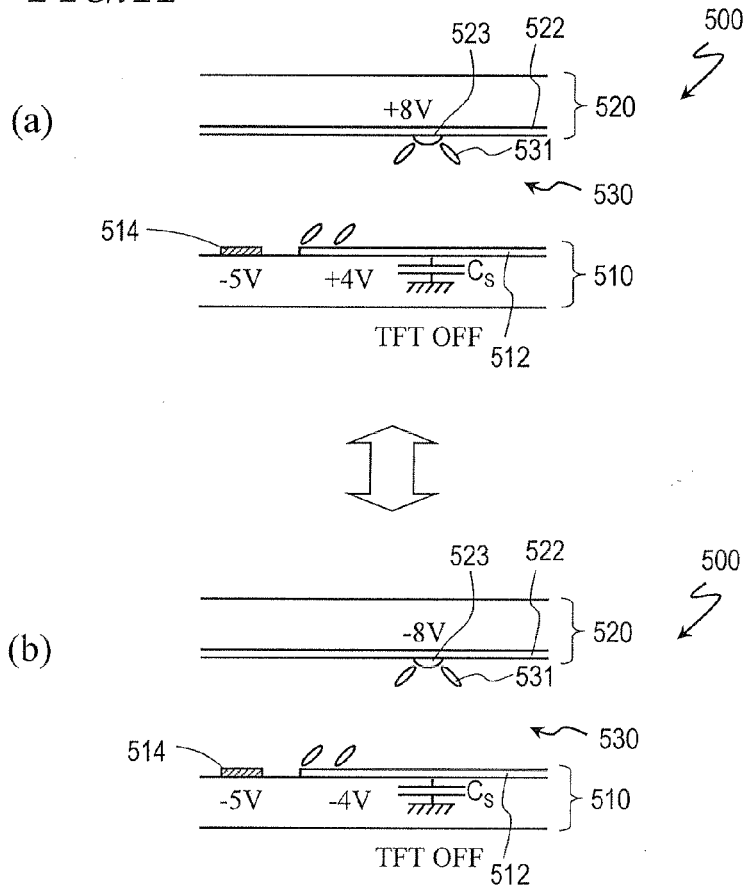
FIG. 11 Diagrams for illustrating the second example of the method of applying a voltage across the liquid crystal layer in the PSA formation step (method (2)).
Figure 12:
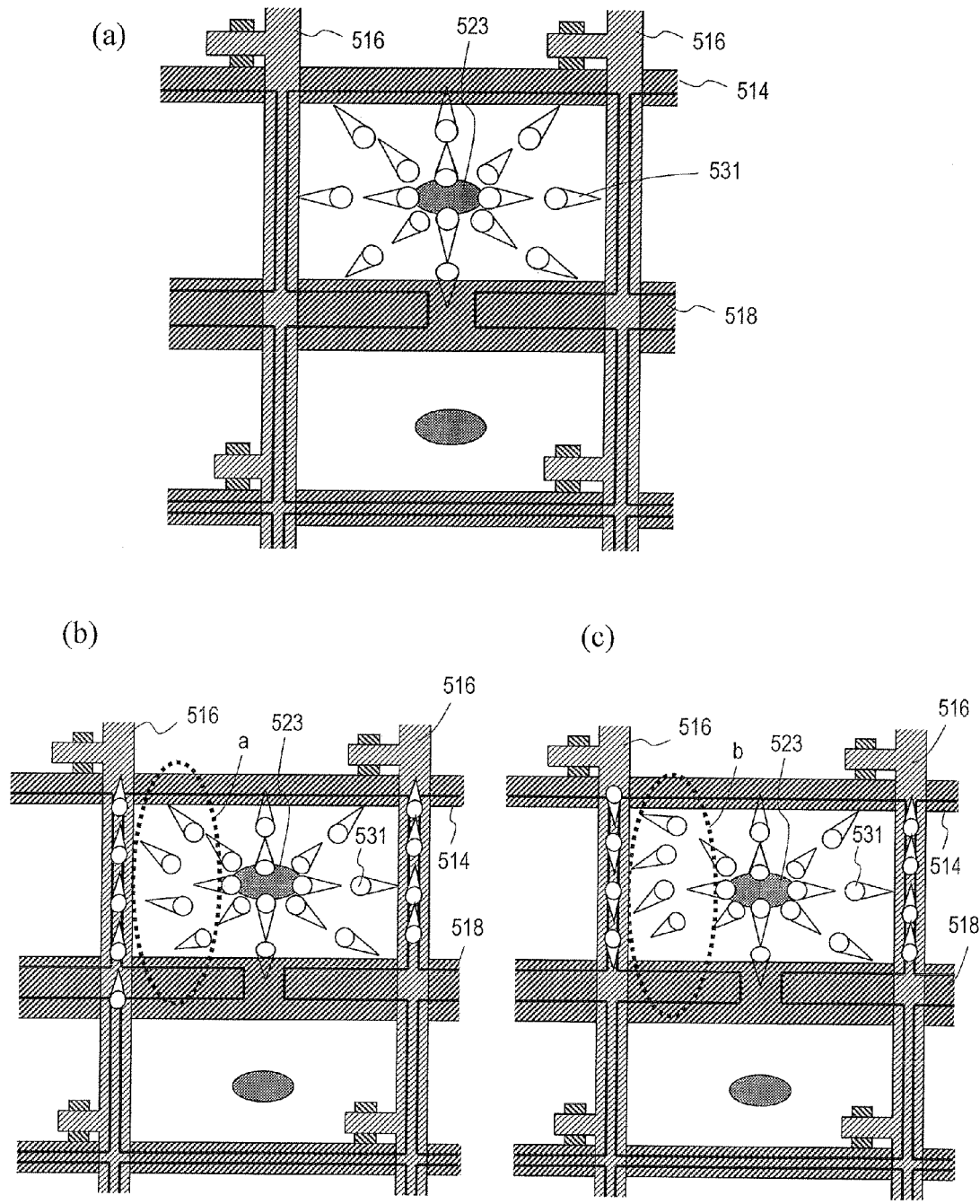
FIG. 12 (a) is a diagram schematically showing an ideal alignment example of liquid crystal. (b) and (c) are diagrams schematically showing alignment examples which include alignment disturbances.

Thus, the liquid crystal display panel 100a which includes the polymer structure 32 shown in FIG. 2 is obtained. This driving method is basically the same as the driving method illustrated in FIG. 10. However, as described above, the liquid crystal display device of the present invention includes the first elevated portion 18a, the second elevated portion 18b, and the third elevated portion 18c of the insulating layer 18 extending over the signal line 15, the scanning line 14, and the storage capacitor line 16, respectively. Therefore, during formation of the polymer structure 32 in the PSA formation step, liquid crystal molecules lying above the respective lines are uniformly inclined toward the center of the subpixel due to the slope surfaces of the elevated portions as shown in FIG. 4(a). Accordingly, the disturbances in the alignment of liquid crystal molecules near the lines such as shown in FIGS. 12(b) and 12(c) decrease, and the polymer structure 32 exerts a regulating force for realizing an alignment form which is approximate to the ideal alignment shown in FIG. 12(a).

Since the liquid crystal display device 100 has the polymer structure 32 which is formed as described above, the alignment regulating force of the polymer structure 32 extending over the respective lines serves to orient (pretilt) the liquid crystal molecules 31 near the polymer structure 32 toward the center of the pixel during the absence of an applied voltage in a display operation. Therefore, during the presence of an applied voltage, the liquid crystal molecules 31 in the pixel can be inclined radially and more uniformly. As a result, disturbances in the alignment which would occur in a display operation decrease, and the variation in alignment among the pixels decreases, so that occurrence of display roughness can be prevented.

Since the first elevated portion 18a, the second elevated portion 18b, and the third elevated portion 18c are provided, the slope surfaces of these elevated portions themselves serve to pretilt the liquid crystal molecules 31 in a display operation. Thus, an ideal alignment can be quickly obtained by application of a voltage. Further, since there are the elevated portions extending over the lines, the parasitic capacitances between the pixel electrodes 12 and the lines can be reduced. Therefore, display of high quality can be obtained in which the decrease in luminance due to crosstalk or a loss in the voltage applied to the liquid crystal is small.

Note that in the present embodiment the elevated portions are provided over the scanning line 14, the signal line 15, and the storage capacitor line 16, although the elevated portions may be provided over only one or two of these lines. Even in such a case, a more ideal alignment can be obtained in which smaller disturbances occur in alignment than in the case where no elevated portion is provided.

As described above, in the liquid crystal display device of the present invention, parts of the insulating layer 18 extending over the signal line 15, the scanning line 14, and the storage capacitor line 16 have the first recessed portion 18a', the second recessed portion 18b', and the third recessed portion 18c', respectively. In the PSA formation step, during formation of the polymer structure 32, liquid crystal molecules 31 lying above the central part of the line (the central part extending between the slope surfaces on the both sides) are in an inclination alignment such that, when viewed along a direction of extension of the line, the liquid crystal molecules 31 on the opposite sides of the recessed portion are inclined toward the recessed portion, making a junction at the recessed portion, as shown in FIG. 4(b). Therefore, the alignment of liquid crystal molecules 31 lying above the line is stable, so that the liquid crystal molecules 31 are prevented from changing their positions or orientations during the formation of the polymer structure 32. Also, the liquid crystal molecules 31 lying above the line are prevented from being oriented in only one direction along the direction of extension of the line. Thus, disturbances in the alignment of liquid crystal molecules in the vicinity of the lines such as shown in FIGS. 12(b) and 12(c) decrease, and the polymer structure 32 exerts a regulating force for realizing an alignment form which is approximate to the ideal alignment shown in FIG. 12(a).

Since the first recessed portion 18a', the second recessed portion 18b', and the third recessed portion 18c' are provided, these recessed portions serve to regulate the alignment of the liquid crystal molecules 31 lying above the lines in a display operation so that, advantageously, a more ideal alignment can be obtained quickly.

Note that in the present embodiment one recessed portion is provided at the middle of respective one of the edges of each subpixel which are extending over the scanning line 14, the signal line 15, and the storage capacitor line 16, although two or more recessed portions may be provided above respective one of the lines in a subpixel. When one pixel is not divided into a plurality of subpixels, one recessed portion may be provided at the middle of respective one of the edges of each pixel, or a plurality of recessed portions may be provided at respective one of the edges of each pixel. Alternatively, the recessed portion may be located at a position deviated from the middle of a subpixel edge or pixel edge so long as a more ideal alignment can be obtained.

The recessed portions may be provided above only one or two of the scanning line 14, the signal line 15, and the storage capacitor line 16. Even in such a case, a more ideal alignment can be obtained in which smaller disturbances occur in alignment than in the case where no recessed portion is provided.

Figure 9:
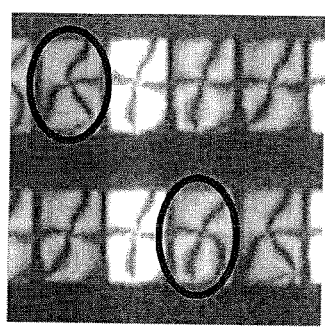
FIG. 9 (a) is a microscopic image showing the alignment of liquid crystal molecules in a conventional liquid crystal display device example. (b) is a microscopic image showing the alignment of liquid crystal molecules in a preferred embodiment of the present invention.
Figure 9:
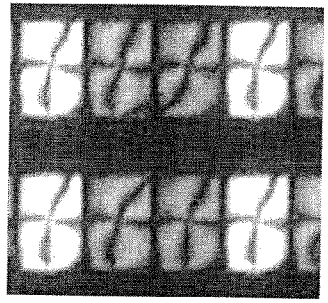

FIGS. 9(a) and 9(b) show microscopic images of a conventional liquid crystal display device example which does not have an elevated portion or a recessed portion above the lines and an example of the liquid crystal display device 100 of the present embodiment in which liquid crystal molecules are inclined and a recessed portion is provided at a midpoint of a signal line in a subpixel. Note that two polarizers are provided in a crossed Nicols arrangement (the polarization axes being perpendicular to each other). With the polarizers in this arrangement, a region in which liquid crystal molecules are oriented vertical to the substrates and a region in which liquid crystal molecules are oriented in an azimuth parallel to or vertical to the polarization axes of the polarizers are observed as being black. On the other hand, a region in which liquid crystal molecules are oriented in an azimuth which is deviated from the polarization axes is observed as being brighter, and a region in which liquid crystal molecules are oriented in an azimuth which forms an angle of 45° relative to the polarization axes is observed as being brightest.

In the conventional liquid crystal display device, the distribution of brighter regions is different between some liquid crystal domains (indicated by solid circles) and the other liquid crystal domains as shown in FIG. 9(a). This means that there is a variation in the liquid crystal alignment among the pixels. On the other hand, in the liquid crystal display device 100 of the present embodiment, the distribution of brighter regions is substantially the same among a plurality of liquid crystal domains as shown in FIG. 9(b). This means that the liquid crystal alignment is generally equal among the pixels. Thus, according to the liquid crystal display device of the present embodiment, in a PSA-type liquid crystal display device, occurrence of display roughness can be prevented.

Since the liquid crystal display device 100 of the present embodiment includes the insulating layer 18 which has the above-described form, the polymer structure 32 can memorize a more ideal radial alignment. Specifically, in the example shown in FIG. 9(a), abnormal alignment was found as represented by downwardly bent dark lines (black lines), such as a dark line on the left side of a red subpixel (a subpixel on the upper row which is indicated by solid circle) and a dark line on the right side of a blue subpixel (a subpixel on the lower row which is indicated by solid circle), for example. On the other hand, in FIG. 9(b) that shows a display state according to the present embodiment, a recessed portion is provided in part of the elevated portion of the insulating layer extending over a signal line, at a position corresponding to a central part of the signal line, so that the alignment of liquid crystal molecules is stable. Therefore, the disturbances in the alignment such as shown in FIG. 9(a) do not occur, and dark lines on the left and right sides in each subpixel stably and uniformly extend in the left and right directions. Thus, according to the present embodiment, a more ideal radial alignment is realized even in the alignment of liquid crystal molecules in a display operation, so that occurrence of display roughness can be decreased.

The liquid crystal display device 100 used in the present embodiment is a CPA-mode liquid crystal display device, to which the present invention is however not limited. The present invention is applicable to a wide variety of liquid crystal display devices which include a vertical alignment type liquid crystal layer and in which a plurality of domains are formed in the presence of an applied voltage across the liquid crystal layer such that the azimuth of inclination of liquid crystal molecules is different among the domains (i.e., divisional alignment type liquid crystal display devices). For example, the present invention is suitably applicable to, for example, an MVA-mode liquid crystal display device.

In the present embodiment, the liquid crystal display device 100 includes the polymer structure 32 that is an alignment control layer provided over a surface of the vertical alignment film 33 which is closer to the liquid crystal layer 30, although a liquid crystal display device which does not include such an alignment control layer, for example, a modification of the liquid crystal display device 100 from which the polymer structure 32 is omitted, is also within the extent of an embodiment of the present invention. Even in such an embodiment, the slope surfaces of the first elevated portion 18a, the second elevated portion 18b, and the third elevated portion 18c serve to pretilt the liquid crystal molecules 31 toward the center of the pixel in a display operation. Thus, an ideal alignment can be obtained quickly by application of a voltage.

Even in a liquid crystal display device which does not include an alignment control layer, the first recessed portion 18a', the second recessed portion 18b', and the third recessed portion 18c' serve to regulate the alignment of liquid crystal molecules 31 lying above the lines during a display operation, so that a more ideal alignment can be obtained quickly. Further, the elevated portions extending over the lines serve to achieve the advantageous effects that are directly provided by the insulating layer 18 extending over the lines during a display operation, which have been described with the use of an example of the liquid crystal display device 100, such as reduction of the parasitic capacitance between the pixel electrodes 12 and the lines.

INDUSTRIAL APPLICABILITY

A liquid crystal display device of the present invention is suitably applicable to a wide variety of liquid crystal display devices, from small size devices to large size devices, including cell phones, PDAs, notebook PCs, display monitors, television receivers, etc.

REFERENCE SIGNS LIST 10 active matrix substrate (first substrate)
11 transparent substrate
12 pixel electrode
12a subpixel electrode
13 thin film transistor (TFT)
14 scanning line
15 signal line
16 storage capacitor line
17 storage capacitor electrode
18 insulating layer
18a first elevated portion
18b second elevated portion
18c third elevated portion
18a' first recessed portion
18b' second recessed portion
18c' third recessed portion
19 storage capacitor counter electrode
20 counter substrate (second substrate)
21 transparent substrate
22 counter electrode
23 protrusion
30 liquid crystal layer
31 liquid crystal molecules
32 polymer structure (alignment control layer)
33 vertical alignment film
100a liquid crystal display panel
100 liquid crystal display device

The invention claimed is:

1. A liquid crystal display device having a plurality of pixels, comprising:
a first substrate which includes thin film transistors corresponding to respective ones of the plurality of pixels, a signal line for supplying a display signal to the thin film transistors, an insulating layer provided on the signal line, and pixel electrodes provided in a matrix arrangement so as to correspond to the plurality of pixels;
a second substrate which includes a counter electrode that opposes the pixel electrodes;
a liquid crystal layer interposed between the first substrate and the second substrate;
a vertical alignment film provided between the first substrate and the liquid crystal layer; and
an alignment sustaining layer provided between the vertical alignment film and the liquid crystal layer for regulating an orientation of liquid crystal molecules included in the liquid crystal layer,
wherein in a region extending between two of the pixel electrodes and extending over the signal line, the insulating layer has a first elevated portion extending along the signal line and protruding above the pixel electrodes toward the liquid crystal layer, and
wherein in a region extending between two of the pixel electrodes and extending over the signal line, the insulating layer has plural ones of the first elevated portion and at least one first recessed portion interposed between the plurality of first elevated portions, the first recessed portion having a smaller thickness than the plurality of first elevated portions.

2. The liquid crystal display device of claim 1, wherein the first recessed portion is provided at a middle of one pixel when viewed along a direction of extension of the signal line.

3. The liquid crystal display device of claim 1, wherein each of the plurality of pixels includes a plurality of subpixels, the pixel electrode includes subpixel electrodes corresponding to respective ones of the plurality of subpixels, and
the first recessed portion is provided at a middle of one subpixel when viewed along a direction of extension of the signal line.

4. The liquid crystal display device of claim 1, wherein the first elevated portion includes a slope portion whose thickness increases along a direction from an inside to an outside of the pixel.

5. The liquid crystal display device of claim 1, wherein in a region extending between two of the pixel electrodes and extending over the signal line, the insulating layer has a first alignment control portion for regulating an orientation of liquid crystal molecules lying above the signal line in terms of a direction along the signal line.

6. The liquid crystal display device of claim 1, wherein the first substrate includes a scanning line for supplying a gate signal to the thin film transistors, and
in a region extending between two of the pixel electrodes and extending over the scanning line, the insulating layer has a second elevated portion extending along the scanning line and protruding above the pixel electrodes toward the liquid crystal layer.

7. A liquid crystal display device having a plurality of pixels, comprising:
a first substrate which includes thin film transistors corresponding to respective ones of the plurality of pixels, a signal line for supplying a display signal to the thin film transistors, an insulating layer provided on the signal line, and pixel electrodes provided in a matrix arrangement so as to correspond to the plurality of pixels;
a second substrate which includes a counter electrode that opposes the pixel electrodes;
a liquid crystal layer interposed between the first substrate and the second substrate;
a vertical alignment film provided between the first substrate and the liquid crystal layer; and
an alignment sustaining layer provided between the vertical alignment film and the liquid crystal layer for regulating an orientation of liquid crystal molecules included in the liquid crystal layer,
wherein in a region extending between two of the pixel electrodes and extending over the signal line, the insulating layer has a first elevated portion extending along the signal line and protruding above the pixel electrodes toward the liquid crystal layer,
wherein the first substrate includes a scanning line for supplying a gate signal to the thin film transistors,
in a region extending between two of the pixel electrodes and extending over the scanning line, the insulating layer has a second elevated portion extending along the scanning line and protruding above the pixel electrodes toward the liquid crystal layer, wherein in a region extending between two of the pixel electrodes and extending over the scanning line, the insulating layer has plural ones of the second elevated portion and at least one second recessed portion interposed between the plurality of second elevated portions, the second recessed portion having a smaller thickness than the plurality of second elevated portions.

8. The liquid crystal display device of claim 7, wherein the second recessed portion is provided at a middle of one pixel when viewed along a direction of extension of the scanning line.

9. The liquid crystal display device of claim 7, wherein each of the plurality of pixels includes a plurality of subpixels, the pixel electrode includes subpixel electrodes corresponding to respective ones of the plurality of subpixels, and the second recessed portion is provided at a middle of one subpixel when viewed along a direction of extension of the signal line.

10. The liquid crystal display device of claim 6, wherein the second elevated portion includes a slope portion whose thickness increases along a direction from an inside to an outside of the pixel.

11. The liquid crystal display device of claim 6, wherein in a region extending between two of the pixel electrodes and extending over the scanning line, the insulating layer has a second alignment control portion for regulating an orientation of liquid crystal molecules lying above the scanning line in terms of a direction along the scanning line.

12. A liquid crystal display device having a plurality of pixels, comprising:

a first substrate which includes thin film transistors corresponding to respective ones of the plurality of pixels, a signal line for supplying a display signal to the thin film transistors, an insulating layer provided on the signal line, and pixel electrodes provided in a matrix arrangement so as to correspond to the plurality of pixels;

a second substrate which includes a counter electrode that opposes the pixel electrodes;

a liquid crystal layer interposed between the first substrate and the second substrate;

a vertical alignment film provided between the first substrate and the liquid crystal layer; and an alignment sustaining layer provided between the vertical alignment film and the liquid crystal layer for regulating an orientation of liquid crystal molecules included in the liquid crystal layer, wherein in a region extending between two of the pixel electrodes and extending over the signal line, the insulating layer has a first elevated portion extending along the signal line and protruding above the pixel electrodes toward the liquid crystal layer, wherein the first substrate has a storage capacitor which is formed by a storage capacitor electrode electrically coupled to the pixel electrodes and a storage capacitor counter electrode which opposes the storage capacitor electrode with the intervention of the insulating layer, and a storage capacitor line electrically coupled to the storage capacitor counter electrode, and in a region extending over the storage capacitor line, the insulating layer has a third elevated portion extending along the storage capacitor line and protruding above the pixel electrodes toward the liquid crystal layer.

13. The liquid crystal display device of claim 12, wherein in a region extending over the storage capacitor line, the insulating layer has plural ones of the third elevated portion and at least one third recessed portion interposed between the plurality of third elevated portions, the third recessed portion having a smaller thickness than the third elevated portions.

14. The liquid crystal display device of claim 13, wherein the third recessed portion is provided at a middle of one pixel when viewed along a direction of extension of the storage capacitor line.

15. The liquid crystal display device of claim 13, wherein each of the plurality of pixels includes a plurality of subpixels, the pixel electrode includes subpixel electrodes corresponding to respective ones of the plurality of subpixels, and the third recessed portion is provided at a middle of one subpixel when viewed along a direction of extension of the storage capacitor line.

16. The liquid crystal display device of claim 12, wherein the third elevated portion includes a slope portion whose thickness increases along a direction perpendicular to a direction of extension of the storage capacitor line.

17. The liquid crystal display device of claim 12, wherein in a region extending over the storage capacitor line, the insulating layer has a third alignment control portion for regulating an orientation of liquid crystal molecules lying above the storage capacitor line in terms of a direction along the storage capacitor line.

* * * * *